United States Patent
Pfadler et al.

(10) Patent No.: US 11,972,689 B2
(45) Date of Patent: Apr. 30, 2024

(54) METHOD, COMPUTER PROGRAM, AND APPARATUS FOR DETERMINING A MINIMUM INTER-VEHICULAR DISTANCE FOR A PLATOON, VEHICLE, TRAFFIC CONTROL ENTITY

(71) Applicant: VOLKSWAGEN AKTIENGESELLSCHAFT, Wolfsburg (DE)

(72) Inventors: Andreas Pfadler, Berlin (DE); Guillaume Jornod, Berlin (DE)

(73) Assignee: VOLKSWAGEN AKTIENGESELLSCHAFT (DE)

( * ) Notice: Subject to any disclaimer, the term of this patent is extended or adjusted under 35 U.S.C. 154(b) by 187 days.

(21) Appl. No.: 17/012,855

(22) Filed: Sep. 4, 2020

(65) Prior Publication Data
US 2021/0074165 A1  Mar. 11, 2021

(30) Foreign Application Priority Data
Sep. 9, 2019  (EP) .................................... 19196177

(51) Int. Cl.
*G08G 1/00* (2006.01)
*B60W 30/165* (2020.01)
(Continued)

(52) U.S. Cl.
CPC ............. *G08G 1/22* (2013.01); *B60W 30/165* (2013.01); *G05D 1/0289* (2013.01);
(Continued)

(58) Field of Classification Search
None
See application file for complete search history.

(56) References Cited

U.S. PATENT DOCUMENTS

| | | |
|---|---|---|
| 10,551,842 B2 | 2/2020 | Lonari |
| 10,684,352 B2 | 6/2020 | El Assaad |
| (Continued) | | |

FOREIGN PATENT DOCUMENTS

| | | |
|---|---|---|
| CN | 105654754 A | 6/2016 |
| CN | 105938660 A | 9/2016 |
| (Continued) | | |

OTHER PUBLICATIONS

Sepulcre et al., Experimental evaluation of cooperative active safety applications based on V2V communications, 2012 (https://doi.org/10.1145/2307888.2307893) (Year: 2012).*

(Continued)

*Primary Examiner* — Lail A Kleinman
*Assistant Examiner* — Mario C Gonzalez
(74) *Attorney, Agent, or Firm* — Barnes & Thornburg LLP

(57) ABSTRACT

A transportation vehicle, a traffic control entity, a method, a computer program, and an apparatus for determining a minimum inter-vehicular distance for a platoon. The method for determining a minimum inter-vehicular distance for a platoon of transportation vehicles obtains information related to a predicted quality of service (pQoS) of communication links between the transportation vehicles of the platoon; a speed of the transportation vehicles of the platoon; and one or more maximum decelerations of the transportation vehicles of the platoon. The method also uses a functional relationship between the pQoS, the speed, the one or more maximum decelerations, and an inter-vehicular distance to determine the minimum inter-vehicular distance.

17 Claims, 8 Drawing Sheets

(51) Int. Cl.
| | |
|---|---|
| *G05D 1/00* | (2024.01) |
| *H04B 17/364* | (2015.01) |
| *H04B 17/373* | (2015.01) |
| *H04W 4/02* | (2018.01) |
| *H04W 4/46* | (2018.01) |

(52) U.S. Cl.
CPC ......... *G05D 1/0297* (2013.01); *H04B 17/364* (2015.01); *H04B 17/373* (2015.01); *H04W 4/027* (2013.01); *H04W 4/46* (2018.02); *B60W 2520/00* (2013.01); *B60W 2554/80* (2020.02)

(56) References Cited

U.S. PATENT DOCUMENTS

| | | | |
|---|---|---|---|
| 11,323,898 B2 | 5/2022 | Alieiev et al. | |
| 2003/0093210 A1* | 5/2003 | Kondo | H04L 9/40 701/96 |
| 2010/0256835 A1 | 10/2010 | Mudalige | |
| 2012/0166059 A1* | 6/2012 | Aso | B60W 30/16 701/96 |
| 2013/0268174 A1* | 10/2013 | Koshizen | G08G 1/00 701/96 |
| 2013/0279325 A1 | 10/2013 | Dunne et al. | |
| 2014/0071814 A1 | 3/2014 | Landscheidt et al. | |
| 2017/0018187 A1* | 1/2017 | Kim | G08G 1/005 |
| 2017/0066443 A1* | 3/2017 | Kobayashi | B60W 30/16 |
| 2018/0035320 A1 | 2/2018 | Drazynski et al. | |
| 2018/0366005 A1 | 12/2018 | Seenumani et al. | |
| 2019/0079538 A1 | 3/2019 | Switkes et al. | |
| 2019/0232962 A1* | 8/2019 | Broll | G08G 1/162 |
| 2020/0260318 A1* | 8/2020 | Kousaridas | H04W 68/005 |
| 2021/0031767 A1* | 2/2021 | Kim | B60Q 1/507 |
| 2022/0095152 A1* | 3/2022 | Szilagyi | H04L 67/56 |

FOREIGN PATENT DOCUMENTS

| | | |
|---|---|---|
| CN | 109131345 A | 1/2019 |
| CN | 109863778 A | 6/2019 |
| CN | 110164124 A | 8/2019 |
| DE | 102017222216 B3 | 5/2019 |
| EP | 2768256 A1 | 8/2014 |
| EP | 3418844 A1 | 12/2018 |
| JP | 2011219056 A | 11/2011 |
| JP | 2013164758 A | 8/2013 |
| KR | 20170047043 A | 5/2017 |
| WO | 2016013996 A1 | 1/2016 |

OTHER PUBLICATIONS

Renda et al., Experimental evaluation of packet inter-reception time, 2015 (https://doi.org/10.1016/j.comcom.2015.06.003) (Year: 2015).*

Librino et al., Measurement-based modeling of packet inter-reception time in presence of radio channel congestion, 2014 (doi: 10.1109/SAHCN.2014.6990381) (Year: 2014).*

3GPP Technical Report 21.915; 3rd Generation Partnership Project; Technical Specification Group Services and System Aspects; Version 0.1.0; Jun. 2018.

Al Alam et al.; An experimental study on the fuel reduction potential of heavy duty vehicle platooning; 13th International IEEE Conference on Intelligent Transportation Systems (ITSC); 2010; pp. 306-311.

Jornod et al.; Sidelink Technologies Comparison for Highway High-Density Platoon Emergency Braking; 16th International Conference on ITS Telecommunications (ITST); Oct. 2018.

Jornod et al.; Packet Inter-Reception Time Modeling for High-Density Platooning in Varying Surrounding Traffic Density; 2019 European Conference on Networks and Communications (EUCNC); IEEE; Jun. 18, 2019; pp. 187-192.

Shladover et al.; Impacts of Cooperative Adaptive Cruise Control on Freeway Traffic Flow; Transportation Research Record: Journal of the Transportation Research Board; 2012; pp. 63-70; No. 2324.

Tsugawa et al.; A review of truck platooning projects for energy savings: IEEE Trans. on Intell. Veh.; Mar. 2016; vol. 1, No. 1; pp. 68-77.

Van De Hoef et al.; Fuel-efficient en route formation of truck platoons; IEEE Trans. on Intell. Transp. Syst. Jan. 2018; vol. 19, No. 1; pp. 102-112.

Search Report for European Patent Application No. 19196177.0; dated Jan. 27, 2020.

Office Action for Korean Patent Application No. 10-2020-0113294; dated Apr. 16, 2021.

Office Action for Chinese Patent Application No. 202010940632.1; dated May 5, 2022.

* cited by examiner

METHOD, COMPUTER PROGRAM, AND APPARATUS FOR DETERMINING A MINIMUM INTER-VEHICULAR DISTANCE FOR A PLATOON, VEHICLE, TRAFFIC CONTROL ENTITY

PRIORITY CLAIM

This patent application claims priority to European Patent Application No. 19196177.0, filed 9 Sep. 2019, the disclosure of which is incorporated herein by reference in its entirety.

SUMMARY

Illustrative embodiments relate to a transportation vehicle, a traffic control entity, a method, a computer program, and an apparatus for determining a minimum inter-vehicular distance for a platoon, more specifically, but not exclusively, to a concept for determining a minimum inter-vehicular distance for a platoon based on a predicted quality of service for a communication link between the transportation vehicles of the platoon.

BRIEF DESCRIPTION OF THE DRAWINGS

Disclosed embodiments will be described using the following non-limiting examples of apparatuses or methods or computer programs or computer program products and with reference to the accompanying figures, in which.

DETAILED DESCRIPTION

Figure 1:
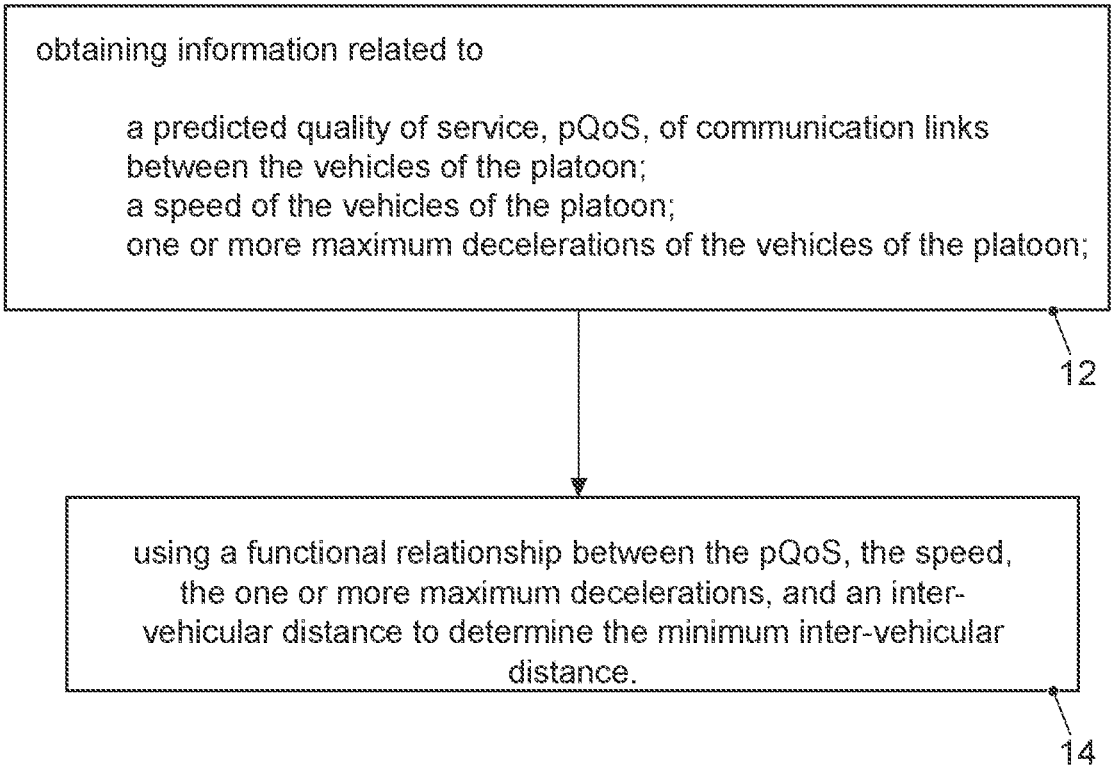
FIG. 1 illustrates a block diagram of an exemplary embodiment of a method for determining a minimum inter-vehicular distance for a platoon of transportation vehicles.

Within the concept of predicted Quality of Service (pQoS), an application supported by a communication system adapts its settings to the foreseen quality of service (QoS). In the vehicular environment one newer application for distance to pQoS adaptation is urban platooning, where the traffic is coordinated by a centralized coordination entity. Urban platooning is a safety-related time-critical application. The traffic may be coordinated by a traffic control center via radio communication (e.g., 5th Generation (5G) system) and the transportation vehicles may form platoons based on direct communication (e.g., 3rd Generation Partnership Project PC5 or Institute of Electrical and Electronics Engineers (IEEE) 802.11p).

Document US2019079538A1 describes a concept for controlling a transportation vehicle to closely follow another transportation vehicle safely using automatic or partially automatic control. The described control schemes are suited for use in transportation vehicle platooning and/or transportation vehicle convoying applications. Methods of initiating a platoon between a host transportation vehicle and a platoon partner are described. A number of specific checks are described for determining whether a platoon controller is ready to initiate platoon control of the host transportation vehicle.

Document EP3418844A1 describes a concept for a local platooning controller and a global platooning controller. An apparatus for a local platooning controller of a transportation vehicle comprises a transceiver module configured to receive information related to a control command from a global platooning controller, and to transmit feedback information to the global platooning controller. The apparatus comprises a control module configured to determine information related to a deviation between control information received with information related to the control command.

from the global platooning controller and an actual state of the transportation vehicle, and to effect transmission of feedback information based on the information related to the deviation.

Document US2010256835A1 describes a method for controlling a speed of a transportation vehicle based upon control messages received through a communications device within the transportation vehicle. The method includes monitoring communication of control messages to a propulsion controller wherein control messages include a speed profile including a current speed command representing instantaneous desired speed of the transportation vehicle and future speed commands representing a predetermined controlled transportation vehicle stop through a speed profile period, detecting anomalous communications of the control messages, and controlling the speed of the transportation vehicle during anomalous communications using the future speed commands.

Document US 2018/0366005 A1 describes a convoy management system and method determining an inter-vehicle spacing in a convoy formed from two or more transportation vehicles traveling together along one or more routes. Controllers onboard the two or more transportation vehicles are instructed to automatically change movement of at least one of the transportation vehicles in the convoy to maintain the inter-vehicle spacing. The inter-vehicle spacing is dynamically changed during movement of the convoy along the one or more routes.

There is a demand for an improved concept for platoon controlling.

Disclosed embodiments are based on the finding that a traffic control center may be responsible for the traffic flow of cities or districts (certain areas). Transportation vehicles may drive automated but a coordination entity (traffic control center) should coordinate the traffic by defining for e.g., the speed, allowed distance between the transportation vehicles, acceleration, deceleration (and also best route etc.). Therefore, the transportation vehicle needs to know how close they might drive and how to behave, e.g., how fast they can accelerate to still be able to brake if another transportation vehicle sends information via direct communication which indicates an emergency braking. It is a further finding that pQoS may be available and an inter-vehicular distance between transportation vehicles of a platoon should take pQoS into account.

Disclosed embodiments provide a method for determining a minimum inter-vehicular distance for a platoon of transportation vehicles. The method comprises obtaining information related to a predicted quality of service, pQoS, of communication links between the transportation vehicles of the platoon. Further information on a speed of the transportation vehicles of the platoon and on one or more maximum decelerations of the transportation vehicles of the platoon is obtained. The method further comprises using a functional relationship between the pQoS, the speed, the one or more maximum decelerations, and an inter-vehicular distance to determine the minimum inter-vehicular distance, IVD. Disclosed embodiments enable using a functional relationship to determine a minimum IVD in a platooning scenario such that pQoS can be considered when controlling the platoon.

The pQoS may comprise a packet inter-reception time. Part of the controlling for platooning in disclosed embodiments is a consideration of a reaction time of the transportation vehicles, i.e., how long it takes a following transportation vehicle to react on a sudden braking maneuver of a transportation vehicle in front. One contributor can be a communication delay, which can be represented by the packet inter-reception time or a round-trip delay. Disclosed embodiments hence enable adaptation of a minimum IVD in a platoon based on predicted packet inter-reception time.

The functional relationship may be based on simulated and/or measurement data. Disclosed embodiments may enable to determine or update the functional relationship based on simulated data, which may enable to analyze many traffic situations in an artificial/simulated environment, and/or measurement data, which is based on real/measured data in the field.

In exemplary embodiments different interpolation or regression methods may be used to determine the functional relationship based on the data. For example, the functional relationship is based on a linear regression of data. Linear regression enables a simple implementation for determining and/or updating the functional relationship. Furthermore, the functional relationship may be based on historical data, e.g., data determined from experience. The determination of the minimum IVD may hence benefit from experiences obtained from earlier situations, simulations, and/or measurements.

The method may comprise monitoring maneuvers of the platoon and storing data on pQoS, speed, decelerations and inter-vehicular distances of the platoon in further exemplary embodiments. Storing such data may form a basis for later updates or improvements of the functional relationship. For example, the functional relationship may be updated based on the stored data.

Disclosed embodiments further provide an apparatus for determining a minimum inter-vehicular distance for a platoon. The apparatus comprises one or more interfaces for communicating with one or more transportation vehicles of the platoon and a mobile communication system. The apparatus further comprises a control module configured to carry out or perform one of the methods described herein.

A transportation vehicle comprising the apparatus is another exemplary embodiment. The transportation vehicle may be configured to assume the role of a platoon member in the platoon or the role of a platoon leader in the platoon. Disclosed embodiments may enable any transportation vehicle of the platoon to determine the minimum IVD in line with the methods described herein.

A traffic control entity comprising the apparatus may be another exemplary embodiment. Hence, an infrastructure component may control the platoon and determine the minimum IVD. The traffic control entity may further comprise a traffic light or a platoon control center.

Disclosed embodiments further provide a computer program having a program code for performing one or more of the described methods, when the computer program is executed on a computer, processor, or programmable hardware component. A further exemplary embodiment is a computer readable storage medium storing instructions which, when executed by a computer, processor, or programmable hardware component, cause the computer to implement one of the methods described herein.

Various example embodiments will now be described more fully with reference to the accompanying drawings in which some example embodiments are illustrated. In the figures, the thicknesses of lines, layers or regions may be exaggerated for clarity. Optional components may be illustrated using broken, dashed or dotted lines.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like or similar elements throughout the description of the figures.

As used herein, the term "or" refers to a non-exclusive or, unless otherwise indicated (e.g., "or else" or "or in the alternative"). Furthermore, as used herein, words used to describe a relationship between elements should be broadly construed to include a direct relationship or the presence of intervening elements unless otherwise indicated. For example, when an element is referred to as being "connected" or "coupled" to another element, the element may be directly connected or coupled to the other element or intervening elements may be present. In contrast, when an element is referred to as being "directly connected" or "directly coupled" to another element, there are no intervening elements present. Similarly, words such as "between", "adjacent", and the like should be interpreted similarly.

The terminology used herein is for the purpose of describing particular exemplary embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "includes" or "including", when used herein, specify the presence of stated features, integers, operations, elements or components, but do not preclude the presence or addition of one or more other features, integers, operations, elements, components or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

FIG. 1 illustrates a block diagram of an exemplary embodiment of a method 10 for determining a minimum inter-vehicular distance, IVD, for a platoon of transportation vehicles. The method 10 comprises obtaining 12 information related to a predicted quality of service, pQoS, of communication links between the transportation vehicles of the platoon, a speed of the transportation vehicles of the platoon, and one or more maximum decelerations of the transportation vehicles of the platoon. The method further comprises using a functional relationship between the pQoS, the speed, the one or more maximum decelerations, and an inter-vehicular distance to determine the minimum inter-vehicular distance.

A platoon of transportation vehicles comprises two or more transportation vehicles. A transportation vehicle may correspond to any conceivable method or mechanism for transportation, e.g., a car, a bike, a motorbike, a van, a truck, a bus, a ship, a boat, a plane, a train, a tram, etc. To enable save operation of the platoon the transportation vehicles need to keep a minimum IVD. For example, considering an emergency brake situation all transportation vehicles of the platoon should be able to reach a stand-still without any collision and with keeping a minimum distance to the transportation vehicle in front at stillstand. To achieve this, multiple factors come into play, the deceleration capabilities of the transportation vehicles, the speed of the transportation vehicles and also any communication quality and delay of the communication links between the transportation vehicles.

Figure 2:
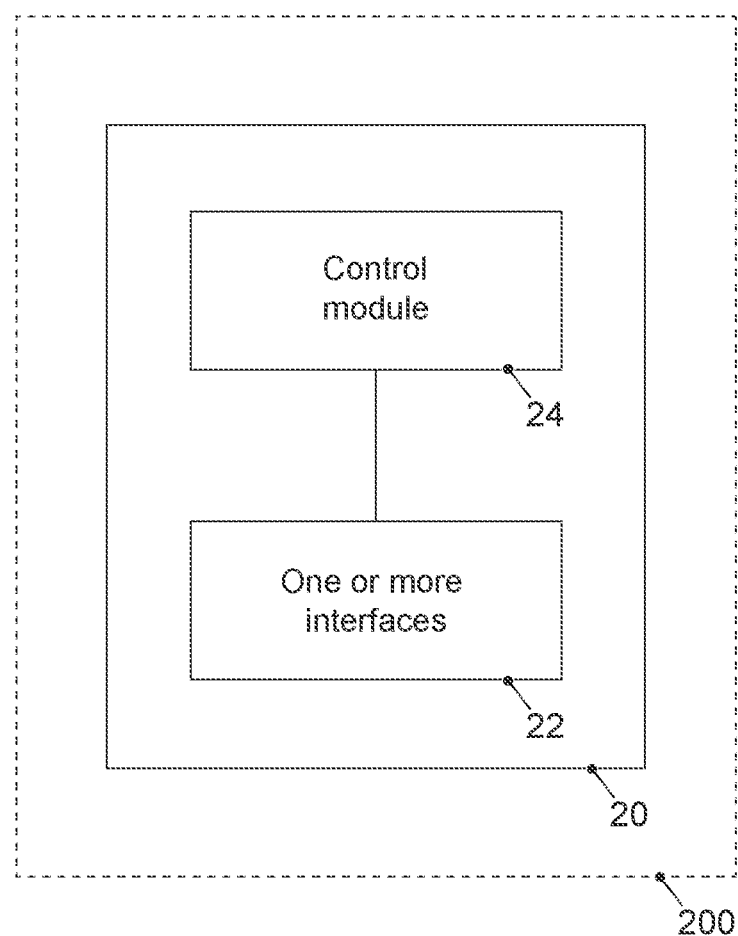
FIG. 2 illustrates a block diagram of an apparatus for determining a minimum inter-vehicular distance for a platoon of transportation vehicles.

FIG. 2 illustrates a block diagram of an apparatus 20 for determining a minimum inter-vehicular distance for a platoon of transportation vehicles. The apparatus 20 comprises one or more interfaces 22 for communicating with one or more transportation vehicles of the platoon and a mobile communication system. The apparatus 20 further comprises a control module 24, which is coupled to the one or more interfaces 22, and which is configured to perform one of the methods 10 described herein.

FIG. 2 further depicts as optional components further exemplary embodiments of an entity 200 which comprises an exemplary embodiment of the apparatus 20. Such an entity 200 could, for example, be a transportation vehicle or a traffic control entity (e.g., a (smart) traffic light or a platoon control center). For example, the transportation vehicle could be part of the platoon, e.g., assuming the role of a platoon member in the platoon or assuming the role of a platoon leader in the platoon.

The apparatus 20 and the entity 200 (e.g., the transportation vehicles of the platoon) may communicate through a mobile communication system. The mobile communication system may, for example, correspond to one of the Third Generation Partnership Project (3GPP)-standardized mobile communication networks, where the term mobile communication system is used synonymously to mobile communication network. The messages (input data, measured data, control information) may hence be communicated through multiple network nodes (e.g., internet, router, switches, etc.) and the mobile communication system, which generates delay or latencies considered in exemplary embodiments.

The mobile or wireless communication system may correspond to a mobile communication system of the 5th Generation (5G, or New Radio) and may use mm-Wave technology. The mobile communication system may correspond to or comprise, for example, a Long-Term Evolution (LTE), an LTE-Advanced (LTE-A), High Speed Packet Access (HSPA), a Universal Mobile Telecommunication System (UMTS) or a UMTS Terrestrial Radio Access Network (UTRAN), an evolved-UTRAN (e-UTRAN), a Global System for Mobile communication (GSM) or Enhanced Data rates for GSM Evolution (EDGE) network, a GSM/EDGE Radio Access Network (GERAN), or mobile communication networks with different standards, for example, a Worldwide Inter-operability for Microwave Access (WIMAX) network IEEE 802.16 or Wireless Local Area Network (WLAN) IEEE 802.11, generally an Orthogonal Frequency Division Multiple Access (OFDMA) network, a Time Division Multiple Access (TDMA) network, a Code Division Multiple Access (CDMA) network, a Wideband-CDMA (WCDMA) network, a Frequency Division Multiple Access (FDMA) network, a Spatial Division Multiple Access (SDMA) network, etc.

Service provision may be carried out by a network component, such as a base station transceiver, a relay station or a UE, e.g., coordinating service provision in a cluster or group of multiple UEs/vehicles. A base station transceiver can be operable or configured to communicate with one or more active mobile transceivers/vehicles and a base station transceiver can be located in or adjacent to a coverage area of another base station transceiver, e.g., a macro cell base station transceiver or small cell base station transceiver. Hence, exemplary embodiments may provide a mobile communication system comprising two or more mobile transceivers/vehicles 200 and one or more base station transceivers, wherein the base station transceivers may establish macro cells or small cells, as e.g., pico-, metro-, or femto cells. A mobile transceiver or UE may correspond to a smartphone, a cell phone, a laptop, a notebook, a personal computer, a Personal Digital Assistant (PDA), a Universal Serial Bus (USB)-stick, a car, a vehicle, a road participant, a traffic entity, traffic infrastructure etc. A mobile transceiver may also be referred to as User Equipment (UE) or mobile in line with the 3GPP terminology.

A base station transceiver can be located in the fixed or stationary part of the network or system. A base station transceiver may be or correspond to a remote radio head, a transmission point, an access point, a macro cell, a small cell, a micro cell, a femto cell, a metro cell etc. A base station transceiver can be a wireless interface of a wired network, which enables transmission of radio signals to a UE or mobile transceiver. Such a radio signal may comply with radio signals as, for example, standardized by 3GPP or, generally, in line with one or more of the above listed systems. Thus, a base station transceiver may correspond to a NodeB, an eNodeB, a gNodeB, a Base Transceiver Station (BTS), an access point, a remote radio head, a relay station, a transmission point, etc., which may be further subdivided in a remote unit and a central unit.

A mobile transceiver or transportation vehicle 200 can be associated with a base station transceiver or cell. The term cell refers to a coverage area of radio services provided by a base station transceiver, e.g., a NodeB (NB), an eNodeB (eNB), a gNodeB, a remote radio head, a transmission point, etc. A base station transceiver may operate one or more cells on one or more frequency layers, in some exemplary embodiments a cell may correspond to a sector. For example, sectors can be achieved using sector antennas, which provide a characteristic for covering an angular section around a remote unit or base station transceiver. In some exemplary embodiments, a base station transceiver may, for example, operate three or six cells covering sectors of 120° (in case of three cells), 60° (in case of six cells) respectively. A base station transceiver may operate multiple sectorized antennas. In the following a cell may represent an according base station transceiver generating the cell or, likewise, a base station transceiver may represent a cell the base station transceiver generates.

The apparatus 20 may be comprised in a server, a base station, a NodeB, a UE, a relay station, or any service coordinating network entity in exemplary embodiments. It is to be noted that the term network component may comprise multiple sub-components, such as a base station, a server, etc.

In exemplary embodiments, the one or more interfaces 22 may correspond to any method or mechanism for obtaining, receiving, transmitting or providing analog or digital signals or information, e.g., any connector, contact, pin, register, input port, output port, conductor, lane, etc. which allows providing or obtaining a signal or information. An interface may be wireless or wireline and it may be configured to communicate, i.e., transmit or receive signals, information with further internal or external components. The one or more interfaces 22 may comprise further components to enable according communication in the mobile communication system, such components may include transceiver (transmitter and/or receiver) components, such as one or more Low-Noise Amplifiers (LNAs), one or more Power-Amplifiers (PAs), one or more duplexers, one or more diplexers, one or more filters or filter circuitry, one or more converters, one or more mixers, accordingly adapted radio frequency components, etc. The one or more interfaces 22 may be coupled to one or more antennas, which may correspond to any transmit and/or receive antennas, such as horn antennas, dipole antennas, patch antennas, sector antennas etc. The antennas may be arranged in a defined geometrical setting, such as a uniform array, a linear array, a circular array, a triangular array, a uniform field antenna, a field array, combinations thereof, etc. In some examples the one or more interfaces 22 may serve the purpose of transmitting or receiving or both, transmitting and receiving, information, such as information, input data, control information, further information messages, etc.

As shown in FIG. 2 the respective one or more interfaces 22 is coupled to the respective control module 24 at the apparatus 20. In exemplary embodiments, the control module 24 may be implemented using one or more processing units, one or more processing devices, any method or mechanism for processing, such as a processor, a computer or a programmable hardware component being operable with accordingly adapted software. In other words, the described functions of the control module 24 may as well be implemented in software, which is then executed on one or more programmable hardware components. Such hardware components may comprise a general-purpose processor, a Digital Signal Processor (DSP), a micro-controller, etc.

In exemplary embodiments, communication, i.e., transmission, reception or both, may take place among mobile transceivers/vehicles 200 directly, e.g., forwarding input data or control information to/from a control center. Such communication may make use of a mobile communication system. Such communication may be carried out directly, e.g., by Device-to-Device (D2D) communication. Such communication may be carried out using the specifications of a mobile communication system. An example of D2D is direct communication between transportation vehicles, also referred to as Vehicle-to-Vehicle communication (V2V), car-to-car, Dedicated Short Range Communication (DSRC), respectively. Technologies enabling such D2D-communication include 802.11p, 3GPP systems (4G, 5G, NR and beyond), etc.

In exemplary embodiments, the one or more interfaces 22 can be configured to wirelessly communicate in the mobile communication system. To do so radio resources are used, e.g., frequency, time, code, and/or spatial resources, which may be used for wireless communication with a base station transceiver as well as for direct communication. The assignment of the radio resources may be controlled by a base station transceiver, i.e., the determination which resources are used for D2D and which are not. Here and in the following radio resources of the respective components may correspond to any radio resources conceivable on radio carriers and they may use the same or different granularities on the respective carriers. The radio resources may correspond to a Resource Block (RB as in LTE/LTE-A/LTE-unlicensed (LTE-U)), one or more carriers, sub-carriers, one or more radio frames, radio sub-frames, radio slots, one or more code sequences potentially with a respective spreading factor, one or more spatial resources, such as spatial sub-channels, spatial precoding vectors, any combination thereof, etc. For example, in direct Cellular Vehicle-to-Anything (C-V2X), where V2X includes at least V2V, V2-Infrastructure (V2I), etc., transmission according to 3GPP Release 14 onward can be managed by infrastructure (so-called mode 3) or run in a UE.

Another application for the adaptation of IVD to pQoS in exemplary embodiments is High-Density Platooning (HDPL), where inter-vehicle distances (IVDs) are below 15m. At this IVD, due to very low detection and reaction times available, sensor systems need to be supported by the reliable exchange of information with other transportation vehicles. The quality of the communication link is therefore critical as the performance of the application is strongly dependent on it. To allow the application to cope with variations on the quality of service, pQoS may provide information on a future quality of the link. This information may come with a prediction horizon, that is the delta time in the future for which the predicted value is applicable. The predicted QoS parameter for HDPL can be the packet inter-reception ratio (PIR), which is basically the expected time between two valid communication messages within a pair of communication partners. In some exemplary embodiments, the pQoS comprises the packet inter-reception time or PIR. For example, the PIR may indicate a round trip time of a data packet such as the time between transmitting a data packet at a transceiver and reception of a response to the data packet at the transceiver.

This parameter varies and may be predicted by a transportation vehicle itself or it may be provided by the network, e.g., a base station or nodeB. In exemplary embodiments, the platoon is enabled to use these PIR times to adapt its maneuver and distance to the communication quality. Such adaptation may be determined or calculated at a transportation vehicle of the platoon (e.g., a platoon member or platoon leader) or at a traffic control entity (e.g., a control center, a smart traffic light, etc. which may be implemented together with a base station or nodeB). Disclosed embodiments may translate the PIR to an adequate IVD using a functional relationship.

The transportation vehicles of the platoon may then adapt their driving behavior according to the pQoS of the communication. In exemplary embodiments, different functions are conceivable which link at least these two parameters and which may also depend on further parameters as: speed, acceleration, deceleration, street profile (as slop of the street) and controller behavior. Furthermore, exemplary embodiments may manage the distance adaptation depending on the pQoS profile.

An explicit function, which links the pQoS value with speeds, accelerations and minimum PIR may be used in exemplary embodiments. This function may be obtained offline with historical data from simulation and/or real testing, e.g., measurements. The functional relationship may be based on historical (data from experience), simulated, and/or measurement data. In some exemplary embodiments, monitoring of maneuvers of the platoon is carried out and data on pQoS, speed, decelerations and inter-vehicular distances of the platoon may be stored for later use. This may enable continuous improvement of the functional relationship. The functional relationship may be updated or refined based on the stored data.

For example, this function can then be used to derive one parameter when the other parameters are given. Because this function is explicit, it can be arranged to change the input and output. For instance, if only the pQoS value is known, then multiple sets of (target speed, deceleration, target IVD) can be obtained. If the pQoS value is known along with the target speed and deceleration, then the function will yield one target IVD.

Through the application of high-density platooning trucks can reduce their overall fuel consumption. Vehicle-to-everything (V2X) communication is seen as an enabler of high-density platooning as part of more environmentally friendly future transportation system. Compared to platooning systems exclusively based on sensors, V2X enabled platooning systems can drive smaller inter-vehicle distances. Utilizing a communication system always implies a certain amount of variation and as a consequence a reduction in the reliability of the overall system. Therefore, an application needs to know the maximal tolerable communication degradation that it might except. Disclosed embodiments derive or use a relationship between maximal tolerable packet losses and IVD. The link between both parameters may be obtained using different linear statistical models.

Future transportation systems are foreseen to reduce emissions and become more environmentally friendly. This motivates a deeper investigation of high-density platooning (HDPL) as it reduces the overall fuel consumption and hence emissions. In addition, may offer more comfort and flexibility to the drivers. The experienced air drag for trucks forming a platoon reduces with the IVD between the automated systems. Therefore, a reduction of fuel consumption and emission is obtained, cf. A. Al Alam, A. Gattami, and K. H. Johansson, "An experimental study on the fuel reduction potential of heavy duty vehicle platooning," in 13th International IEEE Conference on Intelligent Transportation Systems (ITSC), 2010. IEEE, 2010, pp. 306-311.

Extensive research has been conducted in the field of truck platooning and cooperation of automated transportation vehicles, cf. S. Tsugawa, S. Jeschke, and S. E. Shladover, "A review of truck platooning projects for energy savings," IEEE Trans. on Intell. Veh., vol. 1, no. 1, pp. 68-77, March 2016, and S. van de Hoef, K. H. Johansson, and D. V. Dimarogonas, "Fuel-efficient en route formation of truck platoons," IEEE Trans. on Intell. Transp. Syst., vol. 19, no. 1, pp. 102-112, January 2018.

However, to enable these promising gains several open issues need to be addressed. With the introduction of transportation vehicle communication closer IVD are possible. Platooning is a safety critical application and requires a high reliable and low latency communication between the trucks. Communication systems vary in their performance but the quality of the communication may be predicted. The prediction of the communication quality is refereed as predictive Quality of Service (PQoS). Running an application which relies on the quality of service (QoS) of the communication such as HDPL tend to be limited by it.

Figure 3:
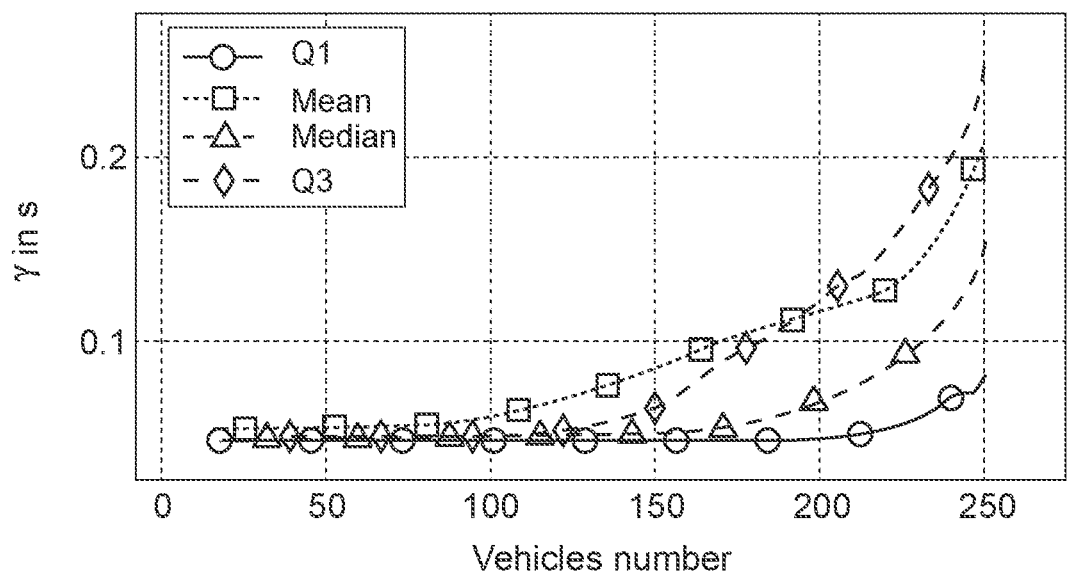
FIG. 3 illustrates a distribution of packet inter-reception ratios as a function of the number surrounding communicating transportation vehicles.

Disclosed embodiments may use the concept of agile quality of service adaptation (AQoSA). Within the concept of AQoSA the application adapts it functional settings to the PQoS of the communication system. Therefore, the communication system receives the QoS requirements from the application. For the decentralized ITS-G5 standard the application can predict the packet inter-reception (PIR) depending on the number of surrounding communication traffic. FIG. 3 illustrates a distribution of packet inter-reception times $\gamma$ as a function of the number surrounding communicating transportation vehicles, Q1 and Q3 denote the first and third quantiles.

Disclosed embodiments address the investigation of the link between safety critical controlling and communication quality within HDPL, deriving a function which links the PIR to the minimum IVD, analyzing general linear model (GLM) in terms of the residues distribution, and using the PIR to IVD function and link them with expected PIR depending on the number of transportation vehicles of an ITS-G5 communication network.

In general, a platoon may be managed by two control levels in exemplary embodiments. First, a global control proceeded by the platoon leader (PLL). Second, a local control performed individually by all platoon members (PLM). Vehicle-to-vehicle (V2V) messages advocate these control levels, where the PLL selects the IVD. With the platoon control message (PCM) each PLM broadcasts individually their dynamic information needed for control of the IVD. In the presented embodiment, the PLL is the first PLM. This however depends on the implementation of global control. V2X communication is an essential feature of the platoon controller implementation. It provides in addition to control data exchange, safety and efficiency to road users, such as transportation vehicles, their passengers, infrastructure and pedestrians, by connecting them. Two technologies are competing to implement V2X: the WiFi based standard ITS-G5, also called pWLAN, and cellular-based V2X (C-V2X) standards proposed by 3GPP. 3GPP made available the first standardization elements of 5G through the release 15, 3GPP, "Release description; Release 15," 3rd Generation Partnership Project (3GPP), Technical Report (TR) 21.915, June 2018, version 0.1.0. It is foreseen that the V2X features of 5G will be available end of 2019 in the release 16.

As an example, emergency braking for HDPL for two trucks is considered. PLL and PLM form a platoon using a cooperative adaptive cruise control (CACC) algorithm similar as detailed in S. Shladover, D. Su, and X.-Y. Lu, "Impacts of cooperative adaptive cruise control on freeway traffic flow: Transportation Research Record: Journal of the Transportation Research Board, no. 2324, pp. 63-70, 2012.

Figure 4:
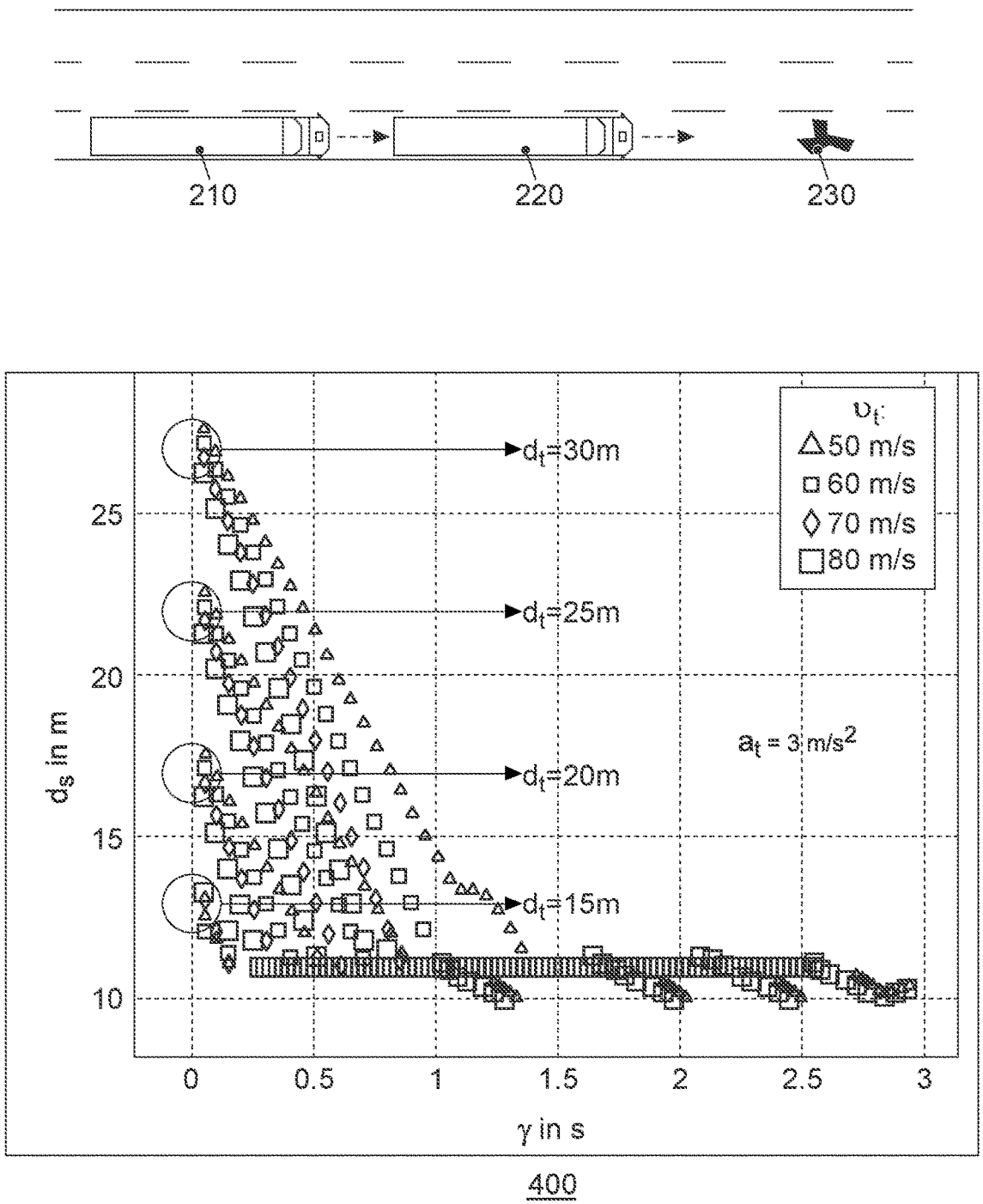
FIG. 4 illustrates an emergency braking scenario at the top and a view chart of stand-still distances after braking as a function of packet inter-reception ratios at the bottom.

FIG. 4 illustrates an emergency braking scenario at the top and a view chart of stand-still distances after braking as a function of packet inter-reception ratios. FIG. 4 illustrates the PLL 220 detecting an obstacle 230 and starting an emergency maneuver. The sensors of the PLM 210 are not able to sense the obstacle as they are impeded by the PLL 220. PLMs 210 detect emergency braking by:
  (i) sensing a discrepancy in the speed of PLL 220;
  (ii) using its CACC control by applying the received deceleration of PCM from the PLL 220;
  (iii) receiving the emergency message (EM) from the PLL, cf. G. Jornod, T. Nan, M. Schweins, A. E. Assaad, A. Kwoczek, and T. Kürner, "Sidelink Technologies Comparison for Highway High-Density Platoon Emergency Braking," in 2018 16th International Conference on ITS Telecommunications (ITST), October 2018.

In case (i) the sensor values are affected by noise and together with (ii) optimized to preserve the platoon formation. Henceforth, case (iii) is essential to perform an adequate emergency maneuver. The consecutive packet loss of case (iii), the EM, can be studied by mapping it to the minimum target IVD for the PLM 210. The PLL 220 sends the EM with transmission rate of 20 Hertz.

The braking behavior of the trucks is emulated with a second order delay element (PT2) with T1=0.021, T2=0.025, and a dead time element of 0.1 s. Note that the derived result is also applicable for more than two trucks. Equal deceleration capabilities of all platoon members are assumed, although in further exemplary embodiments they can be different (the most critical one (lowest deceleration) may be used in some exemplary embodiments). More platoon members implies that each PLM has different inter-antenna distance (IAD) to PLL. High surrounding communication traffic introduces high PIR for larger IVD. For example, for a platoon of five trucks, the PIR is smaller for the second than for the fifth truck. This is studied in more detail in the above referenced article.

FIG. 4 at the bottom shows a view chart of the distance at standstill between the two trucks, ds, for a number of simulations. The stand-still distance after braking, ds, is shown as a function of the PIR for amax=3 m/s2 (maximal deceleration) and selected initial IVDs, dt. For each combination of target speed, vt, target distance ds, and maximal deceleration amax, the maximum PIR permitting to keep a minimum distance of dmin=10 m is derived. As a result, a new dataset linking vt, γ, amax to dt, is obtained totaling to 60 observations. A model can be created that links the PIR along with the driving parameters, velocity and acceleration, to the minimal IVD. To do so, different state of the art statistical models can be used, such as GLM. The functional relationship may be based on a linear regression of data.

In the following exemplary embodiment, a generalized linear model is used.

Let Xt represent the three features.

$$X_t = \begin{bmatrix} v_t \\ \gamma \\ \alpha_{max} \end{bmatrix}^T = \begin{bmatrix} x_1 \\ x_2 \\ x_3 \end{bmatrix}^T, \quad (1)$$

with $x_n$ being the observations vector of the feature n. The d-order polynomial combination of $X_t$ can be taken to obtain a predictor matrix X:

$$X = P_d(X_t) \quad (2)$$

$$X = \begin{bmatrix} 1 & x_1 & x_2 & x_3 & x_1^2 & x_1 x_2 & \ldots & x_1 x_3^{d-1} & x_2^d & x_2^{d-1} x_3 & x_2 x_3^{d-1} & x_3^d \end{bmatrix} \quad (3)$$

$$X = \begin{bmatrix} 1 & x_1^{(1)} & \ldots & x_3^{(1)\times d} \\ \vdots & & \ddots & \vdots \\ 1 & x_1^{(m)} & \ldots & x_3^{(m)\times d} \end{bmatrix} \quad (4)$$

where $x_i^{(j)}$ is the $j^{th}$ observation of the feature i and m=60 the number of observations. The linear regression model is then expressed as:

$$Y_{60\times 1} = X_{60\times p}\beta_{p\times 1} + \epsilon_{60\times 1} \quad (5)$$

where Y is the vector of the targets, the target distances, β are the coefficients and ∈ is the residue vector. p is the number of polynomial combinations:

$$p = \sum_{k=0}^{d} \left(\binom{n+k-1}{k}\right),$$

with n=3 features.

To obtain the coefficients β, the residue term c can be minimized.

Using the Ordinary Least Square (OLS), that is minimizing the L2 norm of the residues:

$$\min_{\beta} \|Y - X\beta\|_2 \quad (6)$$

Figure 5:
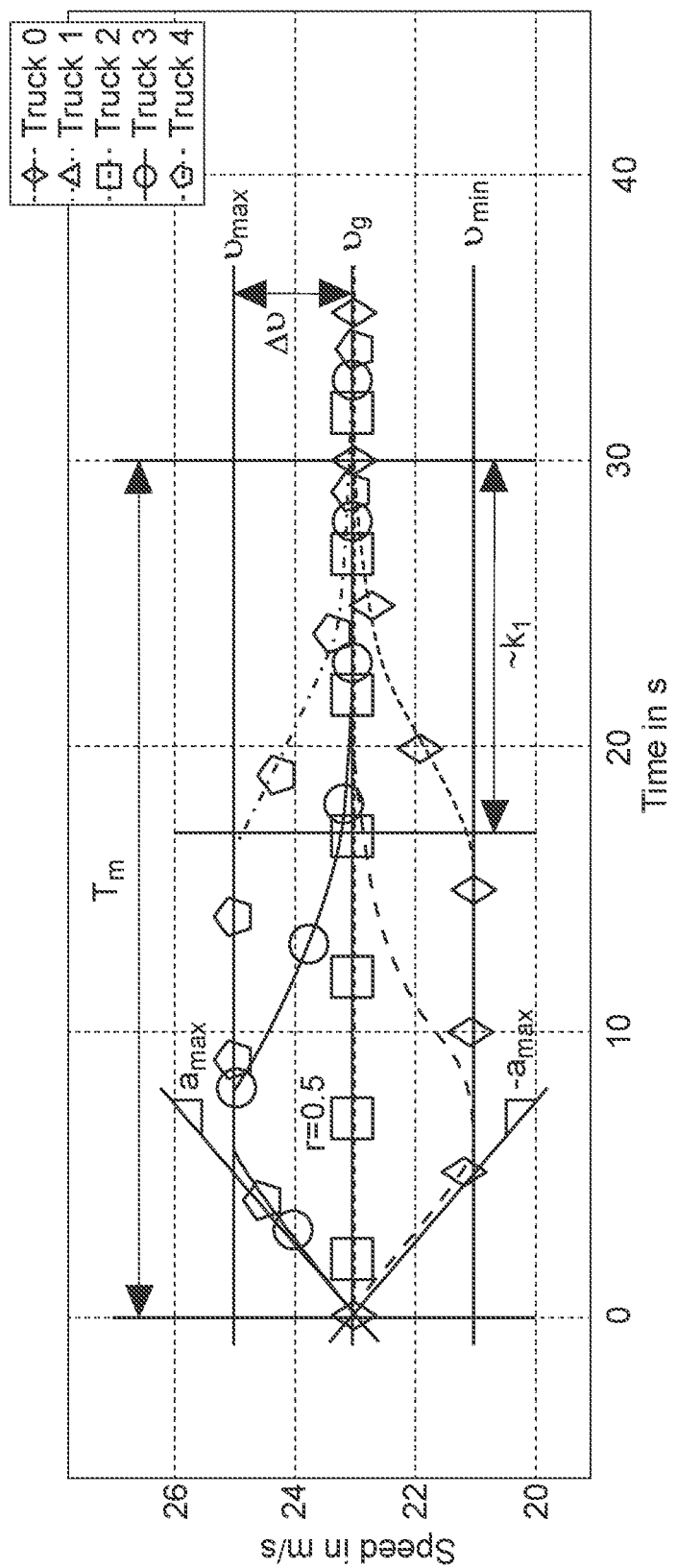
FIG. 5 illustrates an example view chart of truck platoon parameter sets.

Hence, in some exemplary embodiments a function which links the pQoS profile with speeds and accelerations and minimum PIR is obtained. The input parameters are collected. One parameter is the pQoS value from the communication system. Further input parameters are ego data from the platoon members as the maximum acceleration, deceleration, speed constraints, as illustrated by FIG. 5, given by the platoon members. FIG. 5 illustrates an example view chart of truck platoon parameter sets. FIG. 5 shows speed in m/s versus time in s in a view chart for five different trucks. FIG. 5 shows the example in the IVD in a platoon of five trucks is decreased. Truck 2 (supposedly in the middle of the platoon) maintains its speed (square markers) while trucks 0 and 1 decelerate and trucks 3 and 4 accelerate to close the gaps between the transportation vehicles.

Furthermore, there are constraints such as speed limits given by the traffic rules. The slope of the streets also needs to be considered as it has a strong impact on the acceleration and deceleration capabilities of transportation vehicles. This information set needs then to be translated into a single set of dynamic capabilities. Indeed, for each parameter, a limiting factor is defined. For instance, a platoon will be limited by the smaller maximal speed and by the smaller deceleration of its members. FIG. 5 illustrates one option for a scenario and maneuver.

Moreover, the function needs to translate the pQoS profile and the selected parameter set, i.e., PIR, to an adequate IVD to enable a maneuver in line with FIG. 5. Furthermore, the set of ego parameters, i.e., speed, deceleration, acceleration and minimum IVD needs to be communicated to all involved transportation vehicles, so they are able to adapt their driving behavior according to the pQoS profile and limitations of other transportation vehicles.

In an exemplary embodiment, these operations can be summarized as:

First, receiving pQoS profile from communication system and ego data to define the parameter set;

second, using the function which translates the pQoS profile (PIR) to minimum IVD; and third, sharing or communicating the suitable parameter set (max. speed, max acceleration/deceleration) and min. IVD among the transportation vehicles of the platoon.

In the following functions are presented, which link the PIR to IVD with the above-mentioned statistical model and its residue distributions. Furthermore, these functions are associated with a number of transportation vehicles of an ITS-G5 network and discuss further applications.

Figure 6A:
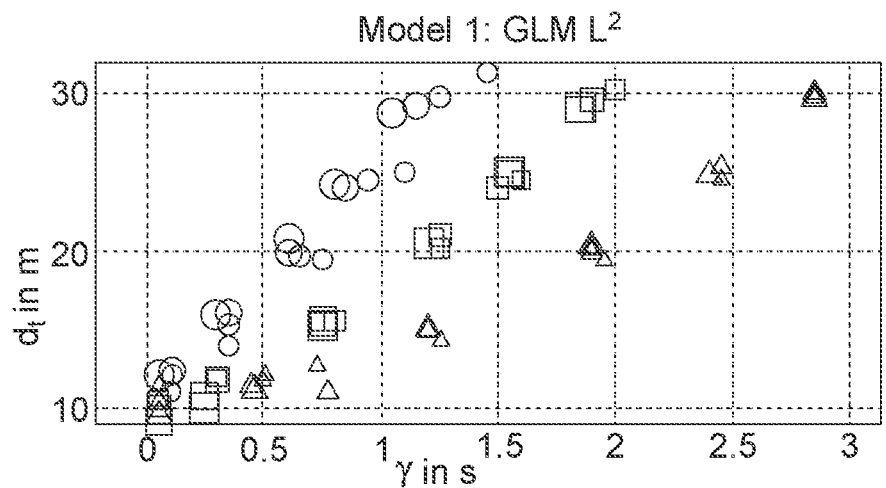
FIGS. 6a-c illustrate minimum target IVD versus delay measurements for a number of different models and settings in various exemplary embodiments.
Figure 6B:
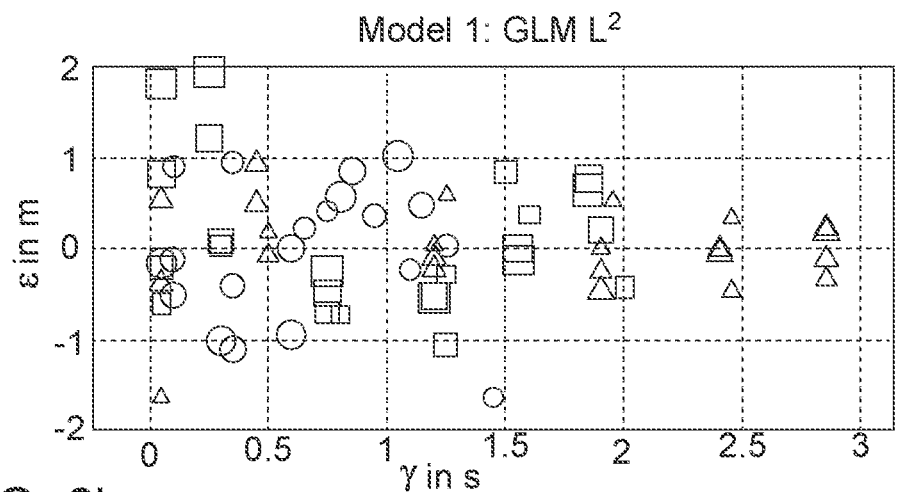
Figure 6C:
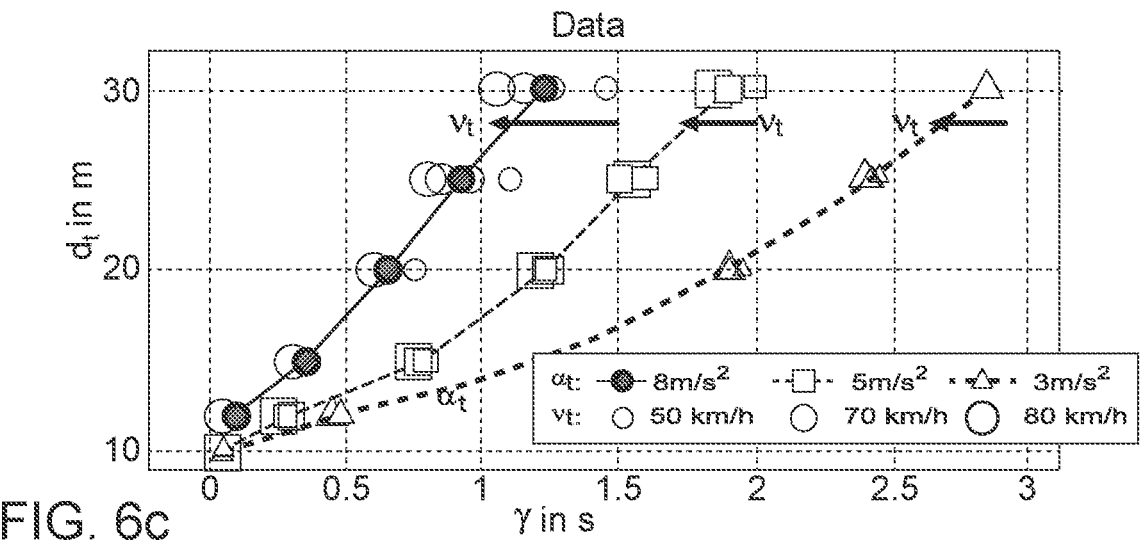

FIG. 6 illustrates minimum target IVD versus delay measurements for an exemplary regression model and settings in various exemplary embodiments. The minimum target distance as a function of PIR is shown. FIG. 6(c) shows the values derived from the simulation data. FIG. 6(a) shows the results from the model for the same combinations of speeds, accelerations and PIR. Marker shapes represent the accelerations (circle 8 m/s2, square 5 m/s2, triangle 3 m/s2), whilst marker sizes denote the platoon velocity (small 50 km/h, medium 70 km/h, large 80 km/h).

The averages per acceleration are shown with lines. FIG. 6(c) shows the values derived from the simulation data (see FIG. 4). This plot is therefore the desired function in an exemplary embodiment to approach with different statistical models. The first model is the GLM with L2-norm minimization. FIG. 6(a) depicts the results from this model in a first exemplary embodiment. FIG. 6(b) illustrates the residues distribution of this model.

Figure 7:
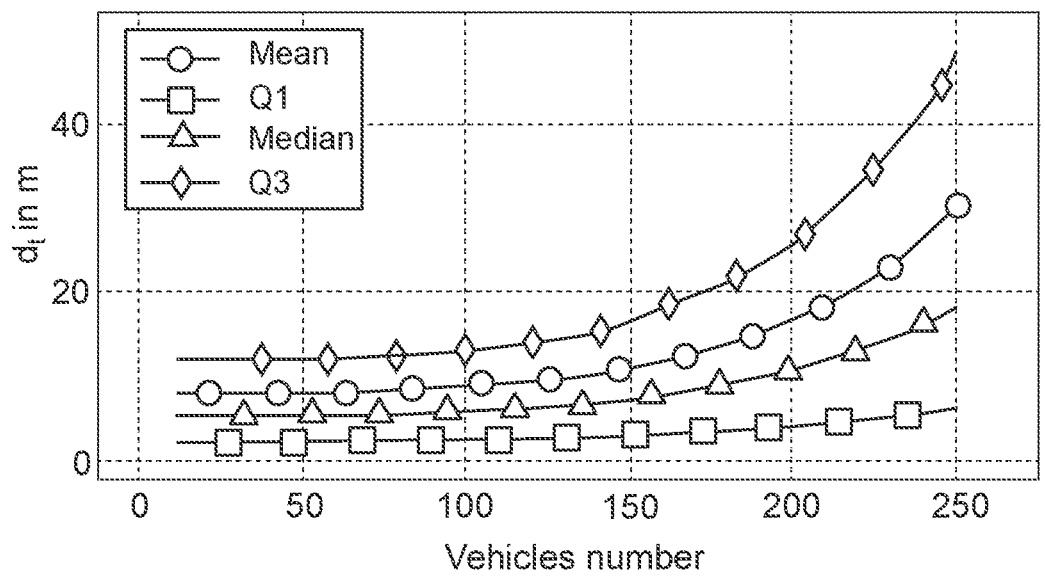
FIG. 7 illustrates minimum target IVD as a function of delay measurements over time.

In another exemplary embodiment ITS-G5 number of transportation vehicles to IVD prediction is used. For a decentralized communication system as ITS-G5 the prediction of the PQoS is not necessarily provided by the network. A transportation vehicle can predict the PIR with the number of communication transportation vehicle in its surrounding as depicted in FIG. 3. The number of transportation vehicles and the expected PIR can be linked with the three functions from above, which gives the target IVD based of the number transportation vehicles. FIG. 7 represents the minimum IVD as a function of the surrounding communication density for the three models with mean probability levels.

The method of obtaining a function which gives the required adaption of the application based of the pQoS is not only applicable to HDPL but also to other applications. In fact, exemplary embodiments may be extended to or used with other applications, where AQoSA is required. Considering the dynamics not only of the application but also from its surrounding leads to certain reaction and adaption time. If this application is done via the radio channel, then the maximal tolerable control delay for the running application is required. New applications as urban platooning and tele-operated driving are such examples, where the application relies on time and safety critical radio communication. For tele-operated driving the speed may be adapted, depending on the PQoS and the mobility of the transportation vehicle environment. In the case of urban platooning similar as for HDPL a minimal IVD may obtained depending on the PQoS.

Disclosed embodiments may enable a platoon to use a pQoS parameter, i.e., PIR, as an input to the proposed function and obtain the minimum IVD. Thereby the fuel saving can be improved.

Figure 8:
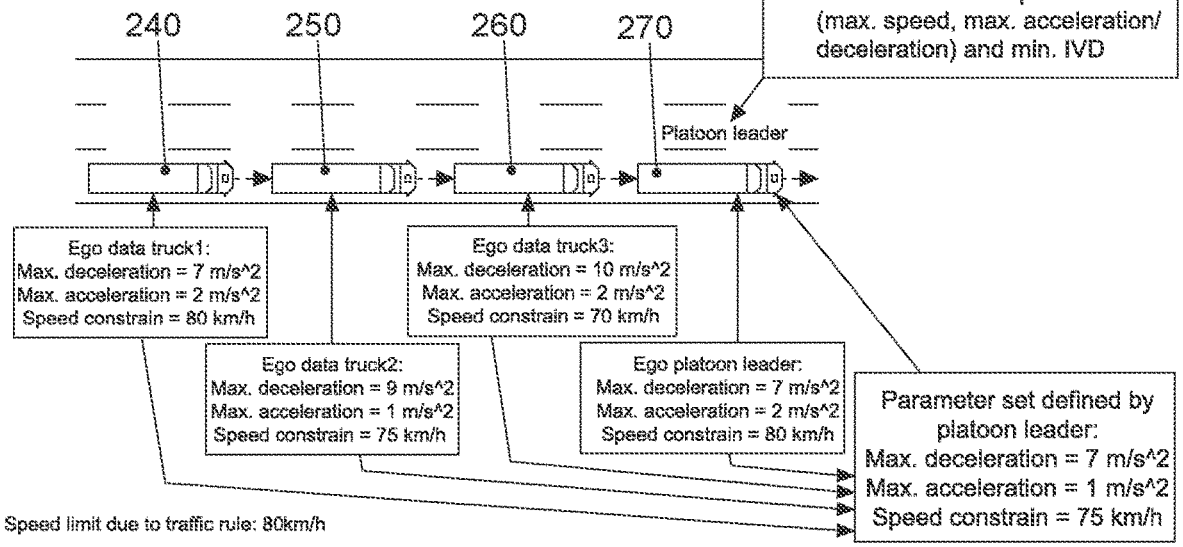
FIG. 8 illustrates examples for truck platooning and urban platooning.
Figure 8:
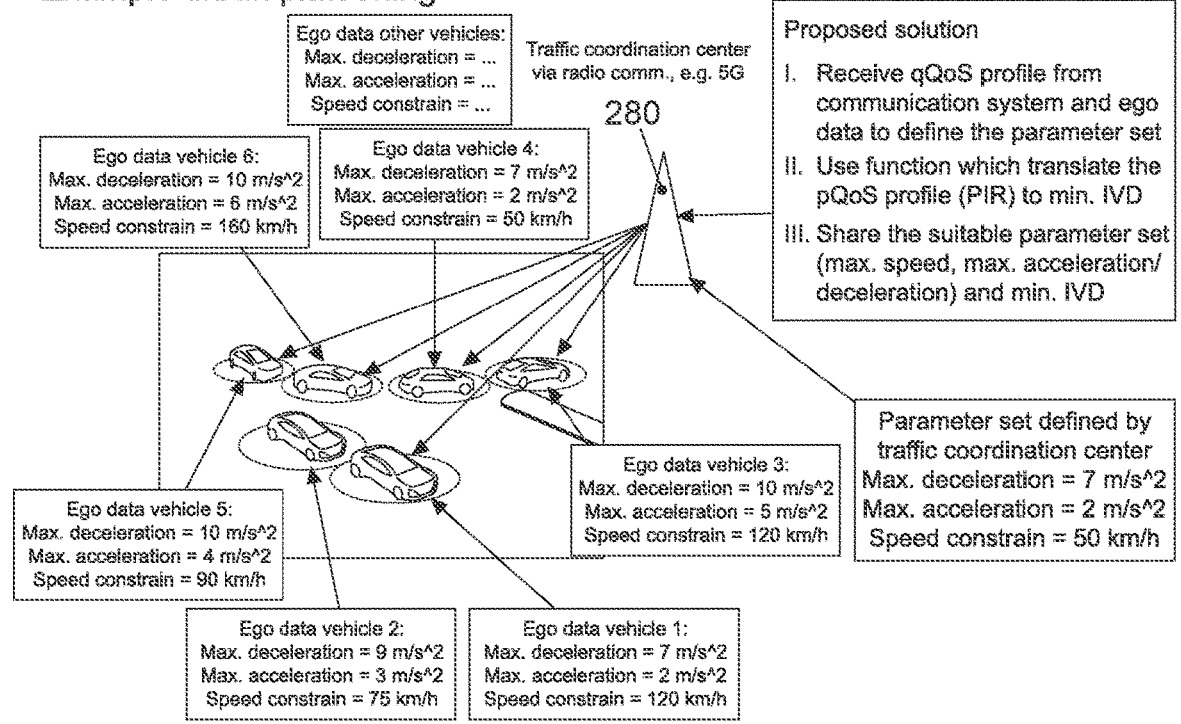

FIG. 8 illustrates examples for truck platooning and urban platooning in exemplary embodiments. FIG. 8 shows a platoon of four trucks 240, 250, 260, and 270 (Platoon leader) in an exemplary embodiment at the top. In this exemplary embodiment, the platoon leader 270 receives pQoS profiles from a communication system and ego data from the platoon members 240, 250, 260 (examples are given in FIG. 8 underneath each truck/vehicle) to define a parameter set. Moreover, a speed limit of 80 km/h is assumed to apply in this scenario. It then uses a function, which translates the pQoS profile (PIR) to a minimum IVD. The platoon leader 270 then shares a suitable parameter set (maximum speed, maximum acceleration/deceleration) and the minimum VD with the platoon members.

FIG. 8 depicts an example of an urban platooning application in an exemplary embodiment at the bottom. In this exemplary embodiment, coordination is done by a traffic coordination center 280 via radio communications, e.g., 5G. In this scenario a speed limit of 50 km/h applies and transportation vehicles 1-6 are coordinated. At the traffic coordination center 280 pQoS profiles are available from the communication system and ego data is received from the transportation vehicles to define a parameter set. A function is then used to translate the pQoS profile (PIR) to the minimum IVD based on the parameter set. Suitable parameters are then provided to the transportation vehicles of the platoon (maximum speed, maximum acceleration/deceleration) and the minimum IVD.

As already mentioned, in exemplary embodiments the respective methods may be implemented as computer programs or codes, which can be executed on a respective hardware. Hence, another exemplary embodiment is a computer program having a program code for performing at least one of the above methods, when the computer program is executed on a computer, a processor, or a programmable hardware component. A further exemplary embodiment is a computer readable storage medium storing instructions which, when executed by a computer, processor, or programmable hardware component, cause the computer to implement one of the methods described herein.

A person of skill in the art would readily recognize that operations of various above-described methods can be performed by programmed computers, for example, positions of slots may be determined or calculated. Herein, some exemplary embodiments are also intended to cover program storage devices, e.g., digital data storage media, which are machine or computer readable and encode machine-executable or computer-executable programs of instructions where the instructions perform some or all of the operations of methods described herein. The program storage devices may be, e.g., digital memories, magnetic storage media such as magnetic disks and magnetic tapes, hard drives, or optically readable digital data storage media. The exemplary embodiments are also intended to cover computers programmed to perform the operations of methods described herein or (field) programmable logic arrays ((F)PLAs) or (field) programmable gate arrays ((F)PGAs), programmed to perform the operations of the above-described methods.

The description and drawings merely illustrate the principles of the disclosure. It will thus be appreciated that those skilled in the art will be able to devise various arrangements that, although not explicitly described or shown herein, embody the principles of the disclosure and are included within its scope. Furthermore, all examples recited herein are principally intended expressly to be only for pedagogical purposes to aid the reader in understanding the principles of the disclosure and the concepts contributed to furthering the art and are to be construed as being without limitation to such specifically recited examples and conditions. Moreover, all statements herein reciting principles and exemplary embodiments, as well as specific examples thereof, are intended to encompass equivalents thereof.

When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, Digital Signal Processor (DSP) hardware, network processor, application specific integrated circuit (ASIC), field programmable gate array (FPGA), read only memory (ROM) for storing software, random access memory (RAM), and non-volatile storage. Other hardware, conventional or custom, may also be included. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the detailed description, where each claim may stand on its own as a separate exemplary embodiment. While each claim may stand on its own as a separate exemplary embodiment, it is to be noted that—although a dependent claim may refer in the claims to a specific combination with one or more other claims—other embodiments may also include a combination of the dependent claim with the subject matter of each other dependent claim. Such combinations are proposed herein unless it is stated that a specific combination is not intended.

It is further to be noted that methods disclosed in the specification or in the claims may be implemented by a device having methods or mechanisms for performing each of the respective operations of these methods.

LIST OF REFERENCE SIGNS 10 method for determining a minimum inter-vehicular distance for a platoon of transportation vehicles
12 obtaining information related to a predicted quality of service, pQoS, of communication links between the transportation vehicles of the platoon; a speed of the transportation vehicles of the platoon; one or more maximum decelerations of the transportation vehicles of the platoon
14 using a functional relationship between the pQoS, the speed, a maximum deceleration, and an inter-vehicular distance to determine the minimum inter-vehicular distance
20 apparatus for determining a minimum inter-vehicular distance for a platoon of transportation vehicles
22 one or more interfaces
24 control module
200 transportation vehicle
210 transportation vehicle
220 transportation vehicle
230 obstacle
240 transportation vehicle
260 transportation vehicle
270 transportation vehicle
280 traffic coordination center

The invention claimed is:

1. An apparatus for controlling a platoon of one or more transportation vehicles, the apparatus comprising:
one or more interfaces including at least one hardware component configured to obtain, receive, transmit, or provide analog or digital signals or information between one or more interfaces for communicating with the one or more transportation vehicles of the platoon and a mobile communication system; and
a control module including a processor, a computer or a programmable hardware component being operable with accordingly adapted software, the control module configured to control the apparatus to:
obtain information related to a predicted quality of service (pQoS) of communication links between the one or more transportation vehicles of the platoon, a speed of the transportation vehicles of the platoon, and one or more maximum decelerations of the one or more transportation vehicles of the platoon;
calculate a permitted minimum inter-vehicular distance using a functional, mathematical relationship between the pQoS, the speed, the one or more maximum decelerations, and an inter-vehicular distance, the permitted minimum inter-vehicular distance being a minimum distance to be permitted between a preceding transportation vehicle and an adjacent proceeding transportation vehicle of the one or more transportation vehicles at which, in an emergency braking situation, the preceding transportation vehicle and the adjacent proceeding transportation vehicle reach a stand-still without a collision, wherein the pQoS includes a packet inter-reception time;
calculate a permitted maximum packet inter-reception time for maintaining the permitted minimum inter-vehicular distance;
adapt the speed of the one or more transportation vehicles based on the permitted minimum inter-vehicular distance and the permitted maximum packet inter-reception time to provide the permitted minimum inter-vehicular distance between the transportation vehicles included in the platoon;
monitor maneuvers of the platoon and repeatedly store data on pQoS, speed, decelerations, and inter-vehicular distances of the platoon during travel of the one or more transportation vehicles; and
repeatedly update the functional, mathematical relationship between the pQoS, the speed, the one or more maximum decelerations, and the inter-vehicular distance that is used to calculate the permitted minimum inter-vehicular distance between the preceding transportation vehicle and the adjacent proceeding transportation vehicle of the one or more transportation vehicles based on the stored pQoS, speed, decelerations, and inter-vehicular distance data to alter the functional, mathematical relationship therebetween,
wherein the pQoS includes a packet inter-reception ratio (PIR) which is an expected time between two successive communication messages between the communication links regarding a data packet and is based on a total number of transportation vehicles proximate to the communication links of the one or more transportation vehicles, and wherein the updating of the functional, mathematical relationship includes a derivation of a maximum value of the PIR permitting maintenance of the permitted minimum inter-vehicular distance for a plurality of combinations of a target speed, a target distance, and a maximal deceleration so as to generate an updated functional mathematical relationship that is based on a dataset linking target speed, PIR, and maximal deceleration over a plurality of observations.

2. The apparatus of claim 1, wherein the functional, mathematical relationship is based on simulated and/or measurement data.

3. The apparatus of claim 1, wherein the functional, mathematical relationship is based on a linear regression of data.

4. The apparatus of claim 1, wherein the functional, mathematical relationship is based on historical data.

5. A transportation vehicle comprising the apparatus of claim 1.

6. The transportation vehicle of claim 5, wherein operation of the apparatus enables the transportation vehicle to be configured to assume a platoon member role in a platoon.

7. The transportation vehicle of claim 5, wherein operation of the apparatus enables the transportation vehicle to be configured to assume a platoon leader role in a platoon.

8. A traffic control entity comprising the apparatus of claim 1.

9. The traffic control entity of claim 8, further comprising a traffic light.

10. The traffic control entity of claim 8, further comprising a platoon control center.

11. A non-transitory computer readable medium including a computer program having a program code for performing operations of the control module of claim 1, when the computer program is executed on a computer, a processor, or a programmable hardware component.

12. A method for controlling a platoon of one or more transportation vehicles, the method comprising:
obtaining, via a control module including a processor, a computer or a programmable hardware component being operable with accordingly adapted software, information related to:
a predicted quality of service (pQoS) of communication links between one or more transportation vehicles of the platoon;
a speed of the one or more transportation vehicles of the platoon; and
one or more maximum decelerations of the one or more transportation vehicles of the platoon; and
calculating a permitted minimum inter-vehicular distance using, via the control module including a processor, a computer or a programmable hardware component being operable with accordingly adapted software, a functional, mathematical relationship between the pQoS, the speed, the one or more maximum decelerations, and an inter-vehicular distance, the permitted minimum inter-vehicular distance being a minimum distance to be permitted between a preceding transportation vehicle and an adjacent proceeding transportation vehicle of the one or more transportation vehicles at which, in an emergency braking situation, the preceding transportation vehicle and the adjacent proceeding transportation vehicle reach a stand-still without a collision, wherein the pQoS includes a packet inter-reception time;
calculating a permitted maximum packet inter-reception time for maintaining the permitted minimum inter-vehicular distance;
communicating, via one or more interfaces including at least one hardware component configured to obtain, receive, transmit, or provide analog or digital signals or information between the one or more interfaces, the minimum inter-vehicular distance between the one or more transportation vehicles of the platoon and a mobile communication system in order to adapt the speed of the one or more transportation vehicles based on the permitted minimum inter-vehicular distance and the permitted maximum packet inter-reception time to provide the permitted minimum inter-vehicular distance between the one or more transportation vehicles included in the platoon;
monitoring maneuvers of the platoon and repeatedly storing data on pQoS, speed, decelerations, and inter-vehicular distances of the platoon during travel of the one or more transportation vehicles; and
repeatedly updating the functional, mathematical relationship between the pQoS, the speed, the one or more maximum decelerations, and the inter-vehicular distance that is used to calculate the permitted minimum inter-vehicular distance between the preceding transportation vehicle and the adjacent proceeding transportation vehicle of the one or more transportation vehicles based on the stored pQoS, speed, decelerations, and inter-vehicular distance data to alter the functional, mathematical relationship therebetween,
wherein the pQoS includes a packet inter-reception ratio (PIR) which is an expected time between two successive communication messages between the communication links regarding a data packet and is based on a total number of transportation vehicles proximate to the communication links of the one or more transportation vehicles, and wherein the updating of the functional, mathematical relationship includes a derivation of a maximum value of the PIR permitting maintenance of the permitted minimum inter-vehicular distance for a plurality of combinations of a target speed, a target distance, and a maximal deceleration so as to generate an updated functional mathematical relationship that is based on a dataset linking target speed, PIR, and maximal deceleration over a plurality of observations.

13. The method of claim 12, wherein the functional, mathematical relationship is based on simulated and/or measurement data.

14. The method of claim 12, wherein the functional, mathematical relationship is based on a linear regression of data.

15. The method of claim 12, wherein the functional relationship is based on historical data.

16. The apparatus of claim 1, wherein the functional, mathematical relationship is based on simulated data.

17. The apparatus of claim 16, wherein the functional, mathematical relationship is further based on measurement data.

* * * * *